Patented Sept. 24, 1935

2,015,062

UNITED STATES PATENT OFFICE 2,015,062

METHOD FOR PRODUCING COLORED SALTS

Charles Smith Benjamin, East Orange, N. J., assignor to General Chemical Company, New York, N. Y., a corporation of New York No Drawing. Application July 30, 1931, Serial No. 554,080

2 Claims. (Cl. 23—88)

This invention relates to the coloring of salts and similar materials by means of dyestuffs or colors, and particularly to the coloring of insecticides and similar poisonous materials to give the same a distinctive color or appearance so that the material will not be mistaken for harmless and non-poisonous materials.

Poisonous salts, such as sodium fluoride, sodium silico fluoride, calcium arsenate, lead arsenate; zinc arsenite, etc. are widely used as insecticides or insect powders and largely for household or agricultural purposes where the insecticide is likely to fall into the hands of uninformed persons. These materials are ordinarily sold in the form of white powders which cannot be readily identified merely by appearance and which have at times been mistaken for flour, sugar, baking powder, etc. with disastrous results.

It has been suggested heretofore to mix materials of non-characteristic color, such as sand, salt, borax and the like, with coloring agents for purposes of identification, and materials such as bath salts are commonly treated with a soluble dye or coloring agent to render the products more attractive. However, processes heretofore used in treating such materials are expensive and involve additional operations on the material treated, which render the precesses unsuitable or objectionable for use in treating salts commonly used as insecticides. For instance, when a coloring material in powder form is mixed with an insecticide powder, the coloring material acts as a diluent which decreases the concentration and effectiveness of the product and further, comparatively large amounts of such dry powdered coloring materials must be used in order to give the product a characteristic appearance. When solutions of coloring agents are applied to dry powdered materials, the material tends to cake and must be dried and reground after the coloring agent has been applied. On the other hand, if a solution of a coloring agent is added to a solution from which the salts to be colored are precipitated or crystallized, the mother liquor formed is colored and much of the dye or coloring agent is lost in the process. Further, the mother liquor so colored cannot be used in the subsequent production of a white or clear product, which is objectionable when more than one form of product is being produced.

Among the objects of my invention are to provide a process for treating insecticides and the like to give the same a characteristic color or appearance which will prevent their being mistaken for other non-poisonous materials. A further object of my invention is to provide a simple and economical process by which materials may be colored without interrupting or materially altering the procedure normally employed for producing such materials.

I have discovered that salts, such as sodium fluoride and similar materials used for insecticides which are produced by precipitation or crystallization from solution, can be given a uniform characteristic color without interrupting the process of producing the salts by forming a solution of the coloring agent to be employed and applying the solution to the salts to be colored after separation of the salts from the mother liquor in which they are formed and while the salts are still damp with wash water or mother liquor, but prior to drying and grinding of the salts. In accordance with my invention therefore, the salts which are wet with mother liquor or washing liquid, are mixed with a solution of a coloring agent preferably so as to color substantially all of the material uniformly and are thereafter dried to remove the adhering liquid carried by the damp salts. By operating in this manner no additional drying or grinding operation is required and all of the dyestuff is utilized rather than but a small part thereof as would be the case if the dyestuff were added to the solution of the salt before precipitation or crystallization and thus were lost in the mother liquor.

It will, of course, be understood that the particular coloring agent employed may be chosen to obtain a product of the desired appearance. I prefer, however, to employ a green coloring agent such as water soluble alkali fast dye which has been found in practice to give insecticides, such as sodium fluoride, a characteristic color which is non-repellant or attractive to insect life. Furthermore, green powdered materials are commonly associated with Paris green which is well known as a poisonous material and the color green is therefore commonly taken as a warning color for powdered materials.

In producing colored sodium fluoride, I prepare sodium fluoride in the usual manner by adding soda ash to hydrofluoric acid solution in amount sufficient to neutralize the acid. The resulting finely divided precipitate of sodium fluoride is then separated from the resulting mother liquor by a centrifuge and the damp salt is passed to a drier by means of a screw conveyor. A water solution of an alkali fast freen dye is formed and applied to the damp finely divided salt being conveyed to the drier by the screw conveyor. The application of the dye solution to the damp salt is regulated to apply the desired amount for giving the color sought. I have found that sodium fluoride may be given the desired appearance by using an amount of a suitable water soluble dye equal to from one pound to two pounds of dye in water solution to one ton of sodium fluoride.

The action of the screw conveyor which transfers the damp salt from the centrifuge to the drier effects a certain amount of mixing of the dye solution with the salt while the agitation of the salt in the drier effects a thorough commingling of the precipitated salt with the dye so that the dye is substantially uniformly applied to the salt particles and distributed throughout the same. The salt, while being mixed and agitated, is simultaneously dried and may be heated to remove moisture and volatile constituents from the colored salt mixture. The dried finely divided and uniformly colored product, if desired, may be further ground and pulverized in the usual manner after the drying and coloring operation.

The steps of drying, grinding and pulverizing the material in practicing my process are the same as those ordinarily employed in treating such salts as sodium fluoride to prepare the same for use as insecticides and therefore my process does not materially alter the procedure now employed in treating such materials. Furthermore, I only need to use a minimum amount of the coloring agent in treating the materials and none of the coloring material is lost in the process.

Sodium fluoride and similar materials treated in accordance with my invention possess a distinct green color which could not be mistaken for flour, baking powder or other household articles of consumption. Furthermore, the insecticide is not decreased in concentration or effectiveness by the application of the coloring agent thereto.

While I have referred specifically to the coloring of sodium fluoride, it will be apparent that other insecticidal material, such as lead arsenate, calcium arsenate, zinc arsenite and sodium silico fluoride as well as other white or colorless materials which, while not insecticides, are formed in the wet and customarily require a drying operation for removal of excess liquid, may be treated in accordance with my invention and may be given any desired color by using a dye or coloring agent of the desired character. The term "salts" as used in the appended claims is thus intended to include any material formed as an insoluble precipitate or residue in the wet.

I claim:

1. The process of producing colored, water insoluble insecticidal salts which comprises forming from a solution a water insoluble precipitate of the salt, separating the precipitated salt from the bulk of said solution, forming a solution of a water soluble dye, adding said dye solution to the precipitated salt while the salt is still damp after the separating operation, and then drying the colored salt.

2. The process of producing colored sodium fluoride which comprises precipitating sodium fluoride from a solution, centrifuging the precipitated salt, forming a solution of a water soluble dye, adding said dye solution to the precipitated sodium fluoride while the salt is still damp from the centrifuge, and then drying the colored sodium fluoride.

CHARLES SMITH BENJAMIN.